A. C. GILBERT.
ELECTRIC SWITCH.
APPLICATION FILED NOV. 26, 1917.

1,424,720.

Patented Aug. 1, 1922.
2 SHEETS—SHEET 1.

Inventor.
Alfred C. Gilbert
by
Attorney.

A. C. GILBERT.
ELECTRIC SWITCH.
APPLICATION FILED NOV. 26, 1917.

1,424,720.

Patented Aug. 1, 1922.
2 SHEETS—SHEET 2.

Inventor.
Alfred C. Gilbert
by Henry Hueberce
Attorney.

UNITED STATES PATENT OFFICE.

ALFRED C. GILBERT, OF NEW HAVEN, CONNECTICUT, ASSIGNOR TO THE A. C. GILBERT COMPANY, OF NEW HAVEN, CONNECTICUT, A CORPORATION OF CONNECTICUT.

ELECTRIC SWITCH.

1,424,720.     Specification of Letters Patent.     Patented Aug. 1, 1922.

Original application filed April 18, 1916, Serial No. 91,976. Divided and this application filed November 26, 1917. Serial No. 203,976.

*To all whom it may concern:*

Be it known that I, ALFRED C. GILBERT, a citizen of the United States, residing in the city and county of New Haven, and State of Connecticut, have invented certain new and useful Improvements in Electric Switches, of which the following is a full, clear, and exact description.

This invention relates to electric switches, and more particularly to switches or like controlling devices used in connection with toy motors of the kind shown in my application, Serial No. 91,976, of which the present case is a division. The invention is not limited, however, to this specific use.

One of the primary objects of the invention is to furnish a switch or like device of very simple and cheap construction which is particularly adapted for controlling the supply of current to toy electric motors and other small electric apparatus.

Another object of the invention is to provide a switch having a casing which is adapted to act as a motor base, if desired, provision being made for readily securing the switch to and detaching it from the motor.

Another object of the invention is to provide an electric switch of the type indicated which can be very readily assembled and taken apart.

Still another object of the invention is to furnish a cheap but efficient reversing switch, whereby the direction of the current supplied to the motor or like apparatus may be reversed.

To these and other ends, the invention consists in the novel features and combinations of parts to be hereinafter described and claimed.

Figure 1:
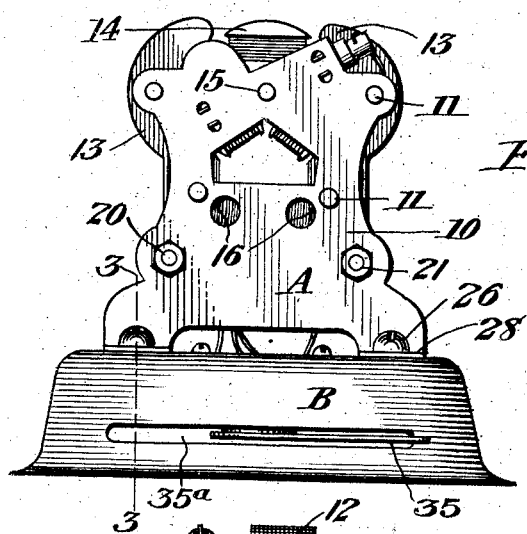
Fig. 1 is a side elevation of a toy motor having a reversing switch embodying my improvements.
Figure 2:
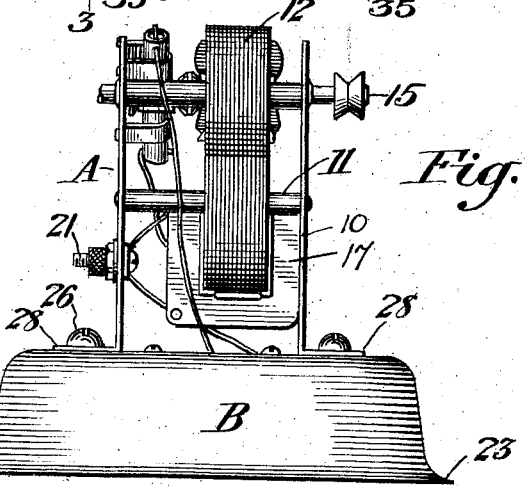
Fig. 2 is an end elevation thereof.
Figure 5:
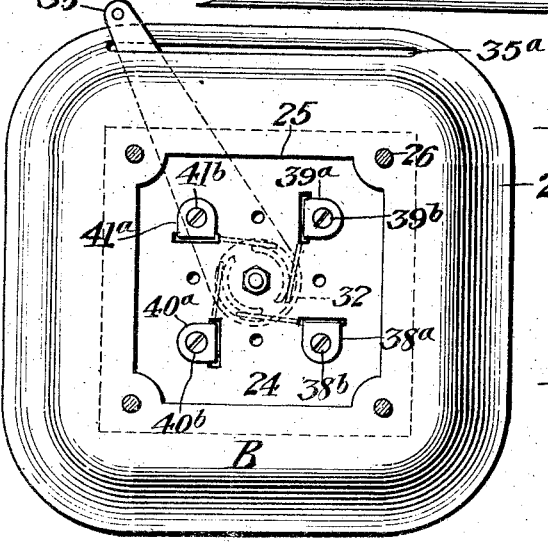
Fig. 5 is a top view of the base, the screws securing the motor proper to the base being shown in section.

The toy motor installation shown in the drawings comprises an electric motor proper A, and a detachable base or foundation plate B for said motor. The main parts of the motor A are for the most part of usual construction. The motor has side plates or frames 10 tied together by rods 11, and supporting a laminated field magnet core 12 of horseshoe type. Between the poles 13 of the field magnet, an armature 14 is rotatably mounted in the usual manner, said armature being fixed to a shaft 15, journalled in the side plates or frames 10. The field magnet 12 is energized by a coil 16 wound around the lower intermediate portion thereof between insulating plates 17. In the form shown, the armature has three poles, each wound in the usual manner, the winding of each pole being connected to a corresponding segment of a suitable commutator (not shown), coacting with the usual brushes 18, 19. Binding posts 20, 21 mounted on one of the side plates 10 are adapted to be connected with a battery or other source of current in the usual manner.

Figure 3:
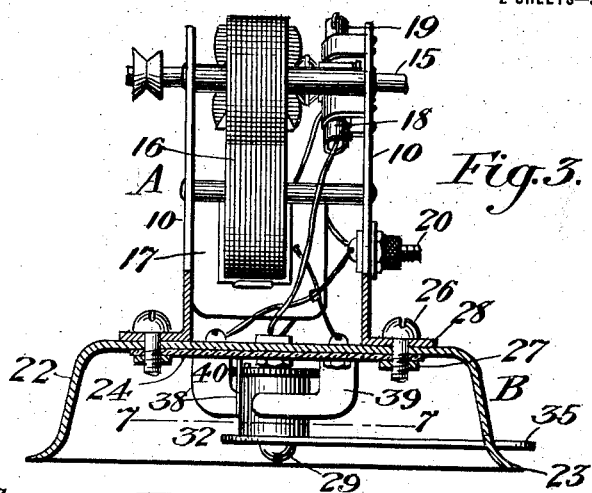
Fig. 3 is an end elevation, partly in section on line 3—3 of Fig. 1.

The base B is preferably constructed as follows: The main part is stamped up from a single sheet metal blank so as to present a cup-shaped plate 22 having a lateral supporting flange 23 at the lower edge thereof. The base is entirely open at the bottom but closed at the top by means of a plate or insert 24 of fiber or other insulating material. The base plate has an aperture at the top, as shown at 25, and the insulating plate 24 is set over the aperture from beneath and clamped against the margins thereof by screws 26 having nicked heads and nuts 27. These screws are also instrumental in securing the motor A to the base, for which purpose integral lugs 28 bent outward from the side plates 10 at the corners of the motor are provided with perforations which are adapted to register with the openings in the base plate 22 and insulating plate 24 through which the screws 26 pass. Fig. 3 shows how the parts are assembled, and how each screw passes through an outstanding lug of the motor, a portion of the base plate 22, and a corner portion of the insulating plate 24. When the motor proper is detached from the base, the screws 26 may still serve as a means for securing the insulating plate to the main base plate. Preferably, the screw openings are all located at the corners of a square, so that the parts may be conveniently secured together in various angular adjustments.

The motor base B serves also as a casing for a motor-controlling device, and in the present instance it encloses a pole-changing or reversing switch for the motor. In the example illustrated, the construction of the pole changing switch is as follows: In the center of the insulating plate, a depending post 29 is mounted by means of nuts 30, 31, so as to extend downward within the hollow base, and on this post a switch member or distributor 32 is swiveled. This switch member may comprise an upper disk 33 of fiber or other insulating material, two spaced arc-shaped segments 34, 34$^a$ placed oppositely to each other, and concentrically with respect to the post 29, and an operating lever 35 for the swinging switch member, comprising a plate portion 36, between which and the disk 33 the segments 34, 34$^a$ are secured in place. The disk 33 and its cooperating clamping portion 36 (also of insulating material) are likewise connected by pins 37 located in the spaces between the segments. At four points around the switch member or segmental drum 32, contact plates 38, 39, 40 and 41 are arranged. Referring, for example, to the contact plate 38, this is formed of an L-shaped sheet metal plate having its upper end 38$^a$ passing through a slot in the insulating plate 24, said upper end being bent laterally and clamped to said plate by means of a screw 38$^b$. The contact plates 39, 40 and 41 are provided with similar upper bent ends 39$^a$, 40$^a$ and 41$^a$ secured in place by screws 39$^b$, 40$^b$ and 41$^b$, which are also adapted to act as binding posts. Near each screw a suitable perforation is provided for leading a wire through the plate to the corresponding binding post.

Figure 4:
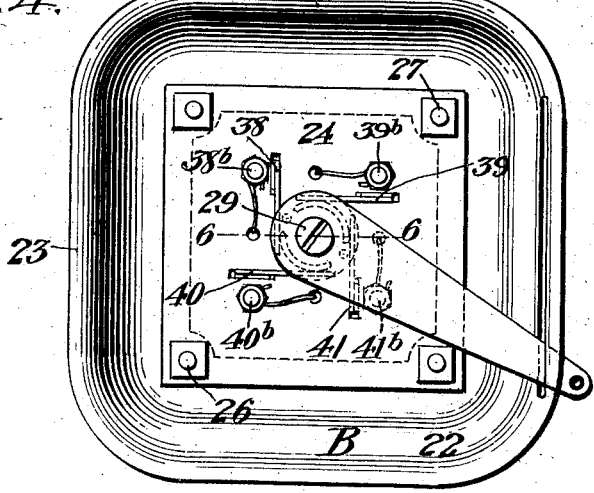
Fig. 4 is a bottom view of the base or foundation plate.
Figure 6:
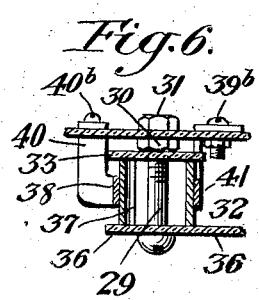
Fig. 6 is a detail section on line 6—6 of Fig. 4.
Figure 7:
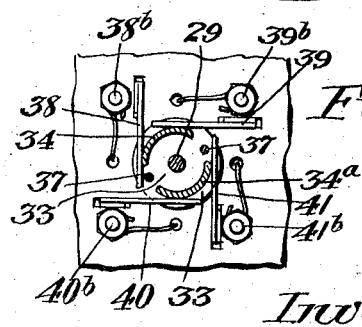
Fig. 7 is a detail of the reversing switch, partly in section on line 7—7 of Fig. 3.

The arrangement is such that when the lever 35 is swung into the position shown in Fig. 4, connection will be established between the binding post 38$^b$ and the binding post 40$^b$ by way of the contact plate 38, segment 34$^a$ and contact plate 40, both of which contact plates may contact with this segment in this adjustment. In a similar manner, connection is simultaneously established between the binding posts 39$^b$ and 41$^b$. When, however, the operating lever 35 is swung to the other limit of its movement, the parts assume the positions shown in Fig. 7, and it will be observed that the binding post 38$^b$ is connected with binding post 39$^b$, whereas binding post 40$^b$ is connected with binding post 41$^b$. The operating lever 35 is limited in its movement by passing outward through a slot 35 in the base which permits said operating lever to have the requisite travel and arrests it in the required positions. When the lever occupies a central position in this slot, the current is cut off by virtue of the provision of the pins 37, which in this adjustment engage the plates 38, 41 and hold them out of contact with both segments. In this manner, short circuiting is prevented because the pins 37 are so located as to prevent two adjacent contact plates from making contact with two of the switch segments at the same time. It will be understood of course that the pins 37 are insulated by the insulating material of the disk 33 and lever 35.

I have not considered it necessary to describe in detail the particular wiring by which reversal of the motor may be obtained by operation of the switch. The motor shown is a series motor, and reversal is obtained by changing the direction of the current flow through the armature. If the binding post 20 is considered the positive pole of the motor, in the switch adjustment shown in Fig. 7, the current will pass from this pole to the binding post 38$^b$, thence to the binding post 39$^b$, thence to brush 18, through the armature to the brush 19, thence to binding post 40$^b$ of the reversing switch, thence to binding post 41$^b$, thence through the field winding 16, and out through the binding post 21. On the other hand, when the reversing switch occupies the position shown in Fig. 4, the current passes from binding post 20 to binding post 38$^b$, thence to binding post 40$^b$, thence to brush 19, through the armature to brush 18, thence to binding post 39$^b$, thence to binding post 41$^b$, and thence outward through the field winding.

Various changes in the details of the construction may be adopted without departing from the scope of the invention as defined in the claims.

I do not claim herein the combination of the switch casing, insulating plate, switch, and motor, as claimed in my application, Serial No. 91,976, previously mentioned.

What I claim is:

1. In an electric switch, a hollow casing member open at the bottom and at the top and adapted to rest on a suitable support, an insulating member secured in the open top portion of said casing member, and a current controlling device mounted on said insulating member and depending therefrom within said hollow base.

2. In an electric switch, a hollow casing member open at the top and adapted to serve as a base for an electric motor, a plate of insulating material secured in the top portion of said casing member, and a switch mounted on said plate of insulating material including an operating lever disposed below the plate and projecting from the casing.

3. In an electric switch, a sheet metal casing member open at the bottom and adapted to rest on a suitable support, said casing member adapted to serve as a base for an electric motor supported on top of the same, a plate of insulating material secured to the top of said casing member, and a switch mounted on said plate of insulating material having an operating member pivotally carried by the insulating plate and disposed below the same.

4. In an electric switch, a hollow casing member open at the bottom and at the top and provided with a slot in a wall thereof, said casing member formed of sheet metal and adapted to serve as a base for an electric motor, a plate of insulating material detachably secured in the open top portion of said base member, a motor controlling device mounted on said plate of insulating material and an operating lever for said device projecting through said slot.

5. In an electric switch, a sheet metal casing member open at the top, a plate of insulating material within said casing member extending across the open top portion thereof, means for detachably securing said insulating plate to said casing member, and a switch mounted on said insulating plate within said casing member including an operating lever projecting through the wall of the casing member.

6. The combination of a hollow base member open at the bottom and at the top, a plate of insulating material detachably secured in the top portion of said base member, and a switch mounted on said plate of insulating material, and depending therefrom within said hollow base, said switch having an operating member projecting outside of the base; substantially as described.

7. In an electric switch, an insulating plate, a base member for supporting the same in an elevated position, four contact plates extending through said insulating plate and depending therefrom, a pivoted switch member mounted between said contact plates so as to connect them in pairs, and an operating member for said switch member extending to one side of said base member; substantially as described.

8. The combination of a hollow base member for a toy electric motor, the base member having an opening at the bottom and at the top, a plate of insulating material detachably secured in the top portion of said base member, a current reversing switch mounted on said plate of insulating material and depending therefrom within said hollow base, said switch comprising a plurality of electrical contacts and a pair of pivoted arc-shaped segments movable into engagement with different pairs of contacts, whereby the current is reversed.

9. The combination with a hollow base member for an electric motor, of a plate of insulating material secured to the top of the base member and within the same, a reversing switch mounted in said base member, comprising four contact plates secured to the insulating material, a shaft depending from said insulating material, a pair of arc-shaped segments cooperating with said contact plates pivotally mounted by and clamped in spaced relation upon said depending shaft, and means for rotating said segments.

10. In a reversing switch, a base, a post secured thereto, a segmental drum adapted to rotate on said post, said drum comprising spaced plates of insulating material mounted upon said post and conductor segments secured between and carried by said plates, and fixed contacts positioned to cooperate with said segments; substantially as described.

11. In a reversing switch, a base, a post secured thereto, a segment drum rotatably mounted on said post, said drum comprising spaced plates mounted upon said post and segments secured between and carried by said plates, and fixed contacts positioned to cooperate with said segments; substantially as described.

12. A reversing switch comprising a rotatably mounted disk of insulating material, a lever fixed to said disk to rotate the same and spaced therefrom, a split ring secured between said lever and disk and mounted concentrically with the axis of rotation of said disk, and fixed contacts positioned to cooperate with the segments of said split ring.

13. A reversing switch comprising a rotatably mounted disk of insulating material, a lever fixed to said disk to rotate the same and spaced therefrom, a split ring secured between said lever and disk and mounted concentrically with the axis of rotation of said disk, fixed contacts positioned to cooperate with the segments of said split ring, and means to limit the movement of the lever.

14. In a switch, a plate of insulating material provided with an opening, a contact member mounted on said plate, one end of the contact member extending into said opening and a combined binding post and clamping device at the said end of the contact member, said plate of insulating material being provided with an opening adjacent to the combined binding post and clamping device through which a conductor is led to the binding post.

In witness whereof, I have hereunto set my hand on the 17 day of November, 1917.

ALFRED C. GILBERT.